United States Patent
Li et al.

(10) Patent No.: US 11,803,447 B2
(45) Date of Patent: Oct. 31, 2023

(54) TRANSACTION PROCESSING METHOD, APPARATUS, AND ELECTRONIC DEVICE FOR BLOCKCHAIN

(71) Applicant: ALIPAY (HANGZHOU) INFORMATION TECHNOLOGY CO., LTD., Zhejiang (CN)

(72) Inventors: Kang Li, Hangzhou (CN); Fuxi Deng, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/347,139

(22) Filed: Jun. 14, 2021

(65) Prior Publication Data
US 2021/0303403 A1    Sep. 30, 2021

(30) Foreign Application Priority Data
Jul. 3, 2020   (CN) .......................... 202010629721.4

(51) Int. Cl.
*G06F 21/00*   (2013.01)
*H04L 9/00*    (2022.01)
(Continued)

(52) U.S. Cl.
CPC ........ *G06F 11/1438* (2013.01); *G06F 9/3851* (2013.01); *G06F 11/1425* (2013.01); *H04L 9/3236* (2013.01); *H04L 9/50* (2022.05)

(58) Field of Classification Search
CPC ............... G06F 11/1438; G06F 9/3851; G06F 11/1425; G06F 9/4843; G06F 9/5016;
(Continued)

(56) References Cited

U.S. PATENT DOCUMENTS 10,509,919 B1   12/2019   Wang et al.
2003/0002440 A1*  1/2003   Calvignac ............... G06F 9/526
                                                    370/229
(Continued)

FOREIGN PATENT DOCUMENTS

CN   106920167 A   7/2017
CN   107402824 A   11/2017
(Continued)

OTHER PUBLICATIONS

First Search for Chinese Application No. 202010629721.4 dated Aug. 12, 2020.
(Continued)

*Primary Examiner* — Haresh N Patel
*Assistant Examiner* — Kevin Ayala

(57) ABSTRACT

Embodiments of this specification provide a transaction processing method, apparatus, and electronic device for a blockchain. The method includes: executing, by a blockchain node in the blockchain, a consensus protocol for an N-th round of consensus, wherein the consensus protocol comprises reaching a consensus on a blockchain transaction of the N-th round of consensus and upon the consensus being reached, executing the blockchain transaction of the N-th round of consensus; writing, by the blockchain node after the execution of the blockchain transaction, a block comprising the blockchain transaction of the N-th round of consensus into the blockchain; and concurrently with the writing of the block, executing, by the blockchain node, the consensus protocol for an (N+1)-th round of consensus in the blockchain.

14 Claims, 2 Drawing Sheets

A blockchain node in a blockchain performs, after execution of a transaction of an N-th round of consensus of the blockchain is completed, a block write operation for the transaction of the N-th round of consensus, where N is a positive integer ─ S102

The blockchain node executes an (N+1)-th round of consensus execution operation of the blockchain, where the consensus execution operation includes an (N+1)-th round of consensus of the blockchain and transaction execution after the (N+1)-th round of consensus is reached, and the (N+1)-th round of consensus execution operation is executed concurrently with the block write operation in the N-th round ─ S104

(51) Int. Cl.
   *G06F 11/14* (2006.01)
   *G06F 9/38* (2018.01)
   *H04L 9/32* (2006.01)

(58) Field of Classification Search
   CPC .................. G06F 9/5027; G06F 9/524; G06F 2209/5018; H04L 9/3236; H04L 2209/38; G06Q 40/04
   See application file for complete search history.

(56) References Cited

U.S. PATENT DOCUMENTS

| | | | |
|---|---|---|---|
| 2012/0216004 A1* | 8/2012 | Abernathy | G06F 9/30123 |
| | | | 711/165 |
| 2017/0132625 A1 | 5/2017 | Kennedy | |
| 2017/0132626 A1 | 5/2017 | Kennedy | |
| 2017/0236121 A1 | 8/2017 | Lyons et al. | |
| 2017/0357966 A1 | 12/2017 | Chandrasekhar et al. | |
| 2018/0181953 A1 | 6/2018 | Lacoss-arnold et al. | |
| 2018/0191503 A1 | 7/2018 | Alwar et al. | |
| 2018/0225448 A1 | 8/2018 | Russinovich et al. | |
| 2018/0293556 A1 | 10/2018 | Hyun et al. | |
| 2018/0351732 A1 | 12/2018 | Wang | |
| 2019/0026146 A1 | 1/2019 | Peffers et al. | |
| 2019/0034465 A1* | 1/2019 | Shimamura | H04L 9/3239 |
| 2019/0182028 A1 | 6/2019 | Arquero et al. | |
| 2019/0182313 A1 | 6/2019 | Yoo et al. | |
| 2019/0188657 A1 | 6/2019 | Arora et al. | |
| 2019/0188700 A1 | 6/2019 | August et al. | |
| 2019/0250989 A1 | 8/2019 | Huang et al. | |
| 2019/0370806 A1 | 12/2019 | Wang et al. | |
| 2019/0378133 A1 | 12/2019 | Deshpande et al. | |
| 2020/0004643 A1* | 1/2020 | Yang | H04L 9/0637 |
| 2020/0311583 A1* | 10/2020 | Manamohan | H04L 9/0643 |
| 2021/0073811 A1* | 3/2021 | Chan | H04L 9/32 |
| 2021/0099294 A1* | 4/2021 | Guo | H04L 9/0643 |
| 2021/0233192 A1* | 7/2021 | Manamohan | G06F 16/2246 |
| 2021/0311773 A1* | 10/2021 | Kogan | G06F 9/52 |

FOREIGN PATENT DOCUMENTS

| | | |
|---|---|---|
| CN | 108647112 A | 10/2018 |
| CN | 109285006 A | 1/2019 |
| CN | 109447810 A | 3/2019 |
| CN | 109949157 A | 6/2019 |
| CN | 110020859 A | 7/2019 |
| CN | 110399424 A | 11/2019 |
| CN | 110517141 A | 11/2019 |
| CN | 110599139 A | 12/2019 |
| CN | 110648136 A | 1/2020 |
| CN | 110659988 A | 1/2020 |
| CN | 111047449 A | 4/2020 |
| CN | 111143885 A | 5/2020 |
| CN | 111327676 A | 6/2020 |

OTHER PUBLICATIONS

Supplementary Search for Chinese Application No. 202010629721.4 dated Aug. 27, 2020.
Supplementary Search for Chinese Application No. 202010629721.4 dated Sep. 4, 2020.
Yang Xiao et al., "A Survey of Distributed Consensus Protocols for Blockchain Networks," IEEE Communications Surveys & Tutorials, Jun. 30, 2020.
Zhu et al., "Research Progress of Blockchain Key Technologies and Their Application," Volumne 51, Issue 3, Mar. 20, 2020.
Extended European Search Report for European Application No. 21 178 242.0 dated Nov. 17, 2021.

* cited by examiner

TRANSACTION PROCESSING METHOD, APPARATUS, AND ELECTRONIC DEVICE FOR BLOCKCHAIN

CROSS-REFERENCE TO RELATED APPLICATION

This application is based on and claims priority to and benefits of Chinese Patent Application No. 202010629721.4, filed with the China National Intellectual Property Administration (CNIPA) on Jul. 3, 2020, the entire content of which is incorporated herein by reference.

TECHNICAL FIELD

This specification relates to the field of blockchain technologies, and in particular, to a transaction processing method, apparatus, and electronic device for a blockchain.

BACKGROUND

Due to the advantages of openness, tamper-proofing and decentralization, blockchain is becoming more popular in various industries. At present, a procedure of transaction processing on a blockchain mainly includes: blockchain nodes perform consensus on a transaction initiated by a client; if the consensus is reached, the transaction is executed, and the transaction is written into a block after the execution is completed. The three stages of consensus, execution and block write are performed in a serial manner, resulting in relatively low transaction processing efficiency.

In the future, blockchain services will grow exponentially. In order to meet the demand of scenarios with high service concurrency, it is necessary to provide a technical solution that can improve blockchain transaction processing efficiency.

SUMMARY

An objective of embodiments of this specification is to provide a transaction processing method, apparatus, and electronic device for a blockchain, to improve the transaction processing efficiency of the blockchain.

According to one aspect, the method may include executing, by a blockchain node in the blockchain, a consensus protocol for an N-th round of consensus, wherein the consensus protocol comprises reaching a consensus on a blockchain transaction of the N-th round of consensus and upon the consensus being reached, executing the blockchain transaction of the N-th round of consensus; writing, by the blockchain node after the execution of the blockchain transaction, a block comprising the blockchain transaction of the N-th round of consensus into the blockchain; and concurrently with the writing of the block, executing, by the blockchain node, the consensus protocol for an (N+1)-th round of consensus in the blockchain.

In some embodiments, the writing of the block comprising the blockchain transaction of the N-th round of consensus into the blockchain uses a first thread; and the executing of the consensus protocol for the (N+1)-th round of consensus in the blockchain uses a second thread that is different from the first thread.

In some embodiments, the method may further include creating, by the blockchain node for the first thread and the second thread, a thread lock for accessing blockchain variables shared by different blockchain transactions, and in the first thread and the second thread, a thread corresponding to a preceding consensus round requests a usage right of the thread lock before a thread corresponding to a post consensus round.

In some embodiments, the method may further include creating, by the blockchain node, a third thread for monitoring whether a block write operation task exists in the second thread; after the blockchain node completes the (N+1)-th round of consensus, if the third thread monitors that no block write operation task exists in the second thread, adding, by the blockchain node, a block write operation task for writing a transaction of the (N+1)-th round of consensus to the second thread.

In some embodiments, the method may further include if the blockchain node crashes when performing the block write operation for the transaction of the N-th round of consensus, obtaining, by the blockchain node from another blockchain node after being restarted and recovered, information of a block in which the transaction of the N-th round of consensus is written; and performing the writing of the block again for the transaction of the N-th round of consensus based on the information of the block, wherein the block is generated by the another blockchain node by completing a block write operation for the transaction of the N-th round of consensus.

In some embodiments, the method may further include if the blockchain node fails to obtain, from the another blockchain node after being restarted and recovered, the information of the block in which the transaction of the N-th round of consensus is written, simulating, by the blockchain node, the N-th round of consensus based on a consensus execution log, to re-determine the transaction of the N-th round of consensus; and performing the writing of the block again for the re-determined transaction of the N-th round of consensus.

In some embodiments, the (N+1)-th round of consensus is initiated by a target blockchain node in the blockchain when the block write operation is performed for the transaction of the N-th round of consensus, and the target blockchain node serves as a consensus master node of the blockchain.

In some embodiments, the method may further include writing, by the blockchain node, a block comprising a transaction of the (N+1)-th round of consensus after completing the latter of (1) writing of the block of the transaction of the N-th round of consensus and (2) the (N+1)-th round of consensus.

In some embodiments, the executing the consensus protocol for the (N+1)-th round of consensus in the blockchain comprises: reaching a consensus on a blockchain transaction of the (N+1)-th round of consensus; upon the consensus being reached, executing the blockchain transaction of the N-th round of consensus; and submitting a commit operation for adjusting a tree structure of the blockchain before writing a block comprising the blockchain transaction of the (N+1)-th round of consensus into the blockchain; wherein the commit operation is submitted after the writing of the block comprising the blockchain transaction of the N-th round of consensus into the blockchain.

According to another aspect, a system may include one or more processors and one or more non-transitory computer-readable memories storing instructions that, when executed by the one or more processors, cause the system to perform the above described methods.

According to yet another aspect, a non-transitory computer-readable storage medium may store instructions that, when executed by one or more processors, cause the one or more processors to perform the above described methods.

Based on the solution in the embodiments of this specification, the blockchain node may execute the block write operation for the transaction of the N-th round of consensus and the (N+1)-th round of consensus execution operation concurrently. That is, while writing a transaction of a current round into a block, the blockchain node also executes a next round of consensus and a transaction on which the next round of consensus is reached, thereby improving the transaction processing efficiency, so that the blockchain is applicable to application scenarios with high service concurrency.

BRIEF DESCRIPTION OF THE DRAWINGS

To describe the technical solutions in the embodiments of this specification or in the existing technologies more clearly, the following briefly introduces the accompanying drawings required for describing the embodiments or the existing technologies. Apparently, the accompanying drawings in the following description show merely some embodiments of this specification, and a person of ordinary skill in the art may still derive other drawings from these accompanying drawings without creative efforts.

DETAILED DESCRIPTION

To enable a person skilled in the art to better understand the technical solutions in this specification, the technical solutions of the embodiments of this specification will be described clearly and thoroughly below with reference to the accompanying drawings of the embodiments of this specification. Apparently, the described embodiments are merely some rather than all of the embodiments of this specification. All other embodiments obtained by a person of ordinary skill in the art based on the embodiments of this specification without creative efforts shall fall within the protection scope of this specification.

As mentioned above, current blockchain nodes complete three stages of consensus, execution and block write of a transaction in a serial manner, which results in relatively low transaction processing efficiency. As the blockchain is becoming more popular in various industries, the service volume will also grow exponentially. Therefore, the existing transaction processing manner may make it difficult for the blockchain to be applied to scenarios with high service concurrency in the future.

To solve this problem, this specification provides a technical solution that can improve the transaction processing efficiency of the blockchain.

Figures 1, 2, 3:
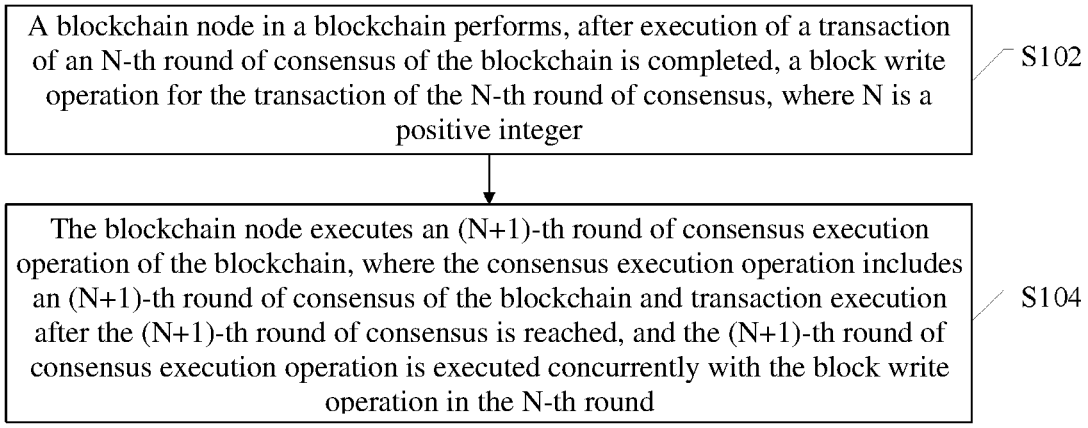
FIG. 1 is a schematic flowchart of a transaction processing method for a blockchain according to an embodiment of this specification.
FIG. 2 is a first schematic diagram of concurrent task processing by a first thread and a second thread in the transaction processing method.
FIG. 3 is a second schematic diagram of concurrent task processing by a first thread and a second thread in the transaction processing method.

FIG. 1 is a flowchart of a transaction processing method for a blockchain according to an embodiment of this specification. The method shown in FIG. 1 may be performed by a corresponding apparatus described in the following, and includes the following steps:

S102: A blockchain node in a blockchain performs, after execution of a transaction of an N-th round of consensus of the blockchain is completed, a block write operation for the transaction of the N-th round of consensus, where N is a positive integer.

In this embodiment of this specification, the transaction of the N-th round of consensus specifically refers to any quantity of transactions on which the N-th round of consensus is reached. The blockchain node may refuse to execute a transaction on which the N-th round of consensus is not reached, and therefore it is unnecessary to write the transaction, on which the consensus is not reached, into a block.

S104: The blockchain node executes an (N+1)-th round of consensus execution operation of the blockchain, where the consensus execution operation includes an (N+1)-th round of consensus of the blockchain and transaction execution after the (N+1)-th round of consensus is reached, and the (N+1)-th round of consensus execution operation is executed concurrently with the block write operation in the N-th round. The execution of any round of consensus execution operation of the blockchain may include executing a consensus protocol to reach a consensus for one or more blockchain transactions involved in the round of consensus. Such consensus protocol may be one of Proof of Work, Proof of Stake, Proof of Space, Proof of Elapsed Time, or another suitable consensus protocol.

In some embodiments, the (N+1)-th round of consensus is initiated by a target blockchain node, which serves as a consensus master node, in the blockchain when the block write operation is performed for the transaction of the N-th round of consensus.

In addition, the concurrent execution herein means that a time point at which the blockchain node performs the (N+1)-th round of consensus execution operation is not earlier than a time point at which the blockchain node performs the block write operation for the transaction of the N-th round of consensus, and the two operations overlap in the time dimension.

It can be learned based on the transaction processing method shown in FIG. 1 that, according to the solution in this embodiment of this specification, the block write operation for the transaction of the N-th round of consensus is executed concurrently with the (N+1)-th round of consensus execution operation. That is, while writing a transaction of a current round into a block, the blockchain node also executes a next round of consensus and a transaction on which the next round of consensus is reached, thereby improving the transaction processing efficiency, so that the blockchain is applicable to application scenarios with high service concurrency.

The transaction processing method in the embodiments of this specification is described in detail below.

In the transaction processing method in the embodiments of this specification, the blockchain node may execute the block write operation by using a first thread and execute the consensus execution operation by using a second thread.

In some embodiments, the first thread and the second thread are different and concurrent. In addition, the first thread herein may be an existing thread. For example, a thread of a block write operation in a previous round is used. Alternatively, the first thread may be a newly created thread. Similarly, the second thread may be an existing thread or a newly created thread, which is not limited in the embodiments of this specification.

Because the first thread and the second thread are executed concurrently, the first thread and the second thread may use blockchain resources simultaneously in practical application. For example, when the first thread performs the block write operation and when the second thread executes the transaction, both threads read and write data (such as a state tree) in the blockchain. However, simultaneous use of the blockchain resources may cause a logic error, thus resulting in a system crash. For instance, when the state tree is being updated (executing a write operation), a reading of the state tree (executing a read operation) may read not-yet-updated state, which may cause logic errors or even system crash. Similarly, updating the state tree concurrently (executing two write operations at the same time) may cause data conflict, which may also cause logic errors or even system crash. Therefore, a thread executing write operations may have exclusive lock on the resources being updated/written to, thereby preventing other read/write operations from being executed on the same resources.

In order to avoid this problem, in the embodiments of this specification, the blockchain node may create, for the first thread and the second thread, a thread lock for accessing blockchain resources, to ensure the safety of the threads. The blockchain resources include a state tree of the blockchain, one or more shared state variables of the blockchain, other resources that are shared by different blockchain transactions, or any combination thereof. In the first thread and the second thread, a thread corresponding to a preceding consensus round requests a usage right of the thread lock before a thread corresponding to a post consensus round.

For example, at the same moment, the first thread executes the transaction of the (N+1)-th round of consensus and the second thread executes the block write operation for the transaction of the N-th round of consensus. In this case, the second thread should obtain the usage right of the thread lock first, to access the blockchain resources. After the second thread completes the block write operation for the transaction of the N-th round of consensus, the first thread then obtains the usage right of the thread lock.

In practical application, the blockchain node may construct an access queue of the thread lock, and add respective tasks of the first thread and the second thread to the access queue according to an order of the corresponding consensus rounds.

As an example for description, the access queue may be shown as the table below:

| Access order | Thread | Task |
| --- | --- | --- |
| 1 | Second thread | Execute the block write operation for the transaction of the N-th round of consensus |
| 2 | First thread | Execute the transaction of the (N + 1)-th round of consensus |
| 3 | Second thread | Execute the block write operation for the transaction of the (N + 1)-th round of consensus |
| 4 | First thread | Execute a transaction of an (N + 2)-th round of consensus |

In addition, the blockchain node may generate a service logic error when performing block write operations for transactions of different consensus rounds simultaneously, which results in a system crash. For example, a client A initiates an expense transaction in the N-th round of consensus, and there is another expense transaction initiated by the client A in the (N+1)-th round of consensus; if the transactions of the N-th round and the (N+1)-th round of consensus are written into blocks simultaneously, the two different expense transactions recorded in the blocks may have a timing error. To avoid this problem, the blockchain node should perform the block write operation for the transaction of the (N+1)-th round of consensus after completing the block write operation for the transaction of the N-th round of consensus and the (N+1)-th round of consensus execution operation.

During actual implementation, in the method in the embodiments of this specification, it may be monitored, by using a third thread (where the third thread may be the first thread, or may be a new thread other than the first thread and the second thread), whether a block write operation task exists in the second thread. After the (N+1)-th round of consensus execution operation is completed, if it is monitored, based on the third thread, that no block write operation task exists in the second thread, a block write operation task for the transaction of the (N+1)-th round of consensus is added to the second thread.

The execution sequences of the first thread and the second thread are described in detail below.

For the current blockchain, a consensus phase takes a relatively short period of time, which is generally 20 ms to 30 ms; a block write phase takes a relatively long period of time, which is generally 100 ms to 200 ms; a transaction execution phase takes different periods of time according to different transaction types, where the period of time may be shorter than or longer than the time spent on the block write phase. Therefore, in some scenarios, the blockchain node may complete a next round of consensus execution operation within a period of a block write operation for a transaction of a current round of consensus; in some other scenarios, the blockchain node does not complete the next round of consensus execution operation within the period of the block write operation for the transaction of the current round of consensus.

For ease of understanding, refer to a schematic diagram of task execution in the first thread and the second thread shown in FIG. 2. In FIG. 2, the horizontal direction represents time, T1 represents a time point at which the blockchain node starts block write for a transaction of an (N−1)-th round, T2 represents a time point at which the blockchain node finishes the block write for the transaction of the (N−1)-th round, and T3 represents a time point at which the blockchain node finishes executing the transaction of the (N+1)-th round. In the embodiments of this specification, assuming that a time spent on the block write in the (N−1)-th round is longer than a time spent on the N-th round of consensus execution operation, the blockchain node should execute and complete the following operations within the time period from T2 to T3: the (N+1)-th round of consensus, and execution of the transaction of the (N+1)-th round, and may start the block write operation for the transaction of the N-th round at a time point earlier than T2. Assuming that a time spent on the block write in the N-th round is shorter than a time spent on the (N+1)-th round of consensus execution operation, the blockchain node should complete the block write operation in the N-th round before T3, and start the block write operation for the transaction of the (N+1)-th round at a time point not earlier than T3. In other words, the block write operation for the transaction of a next round of consensus is performed after completing the latter of (1) the block write operation for the transaction of a current round of consensus and (2) the next round of consensus execution operation.

In addition, before executing the block write operation, the blockchain node may further submit a commit operation for a transaction that needs to be written into a block. The commit operation is used for adjusting a tree structure of the blockchain before the transaction is written into the block. In some embodiments, the commit operation may also be added to the consensus execution operation. Correspondingly, a commit operation in the (N+1)-th round of consensus execution operation should be executed after the block write operation for the transaction of the N-th round of consensus is completed.

For ease of understanding, refer to a schematic diagram of task execution in the first thread and the second thread shown in FIG. 3. In FIG. 3, T4 represents a time point at which the blockchain node starts writing a block including the transaction of the N-th round into the blockchain, T5 represents a time point at which the blockchain node finishes the block write for the transaction of the N-th round, and T6 represents a time point at which the blockchain node starts the block write for the transaction of the (N+1)-th round. In the embodiments of this specification, the blockchain node may execute and complete the following operations within the time period from T4 to T5: the (N+1)-th round of consensus, and execution of the transaction of the (N+1)-th round (of consensus); and start, at a time point not earlier than T5, the commit operation after the execution of the transaction of the (N+1)-th round, and start the block write operation for the transaction of the (N+1)-th round at a time point not earlier than T6. That is, the block write operation for the transaction of the (N+1)-th round is executed after the commit operation is finished. Also, the (N+2)-th round of consensus and execution of the transaction of the (N+2)-th round of consensus also occur after the commit operation is finished.

Further, in addition to executing the block write operation and the consensus execution operation concurrently, ensuring smoothness of the block write is also an important means for improving the transaction processing efficiency of the blockchain.

In some embodiments, if the blockchain node crashes when performing the block write operation for the transaction of the N-th round of consensus (the blockchain node may lose the transaction on which the N-th round of consensus is reached), after being restarted and recovered, the blockchain node may obtain, from another blockchain node, information of a block in which the transaction of the N-th round of consensus is written, so as to perform the block write operation for the transaction of the N-th round of consensus again based on the information of the block, where the block is generated by the another blockchain node by completing a block write operation for the transaction of the N-th round of consensus.

For ease of understanding, it is assumed that the blockchain includes blockchain nodes A, B, and C. After execution of the transaction of the N-th round of consensus is completed, the blockchain nodes A, B, and C each need to perform a block write operation for the transaction of the N-th round of consensus, to generate, in respective sub-blockchains, new blocks in which the transaction of the N-th round of consensus is written. Assuming that in the block write process, the blockchain node A crashes and fails to complete the block write operation for the transaction of the N-th round of consensus, the blockchain node A may request information of the latest block from either of the blockchain nodes B and C. The transaction of the N-th round of consensus is written in the information of the latest block. Therefore, the blockchain node A may perform the block write operation for the transaction of the N-th round of consensus again based on the information of the latest block requested from the another blockchain node, so as to generate, in the sub-blockchain of the blockchain node A, a latest block synchronous with those of the blockchain nodes B and C.

If the blockchain node, after being restarted and recovered, fails to obtain the information of the block in which the transaction of the N-th round of consensus is written from another blockchain node, the blockchain node may simulate the N-th round of consensus based on a consensus execution log, to re-determine the transaction of the N-th round of consensus, and then writes the re-determined transaction of the N-th round of consensus into a block.

For ease of understanding, it is still assumed that the blockchain includes blockchain nodes A, B, and C. The blockchain nodes A, B, and C each store a consensus execution log with a watermark for each round of consensus, where the consensus execution log may be recorded in any block in a sub-blockchain of each of the blockchain nodes A, B, and C. For example, in the phase of the N-th round of consensus, the blockchain nodes A, B, and C may each store an execution log of the N-th round of consensus into blocks generated in the (N−1)-th round and (N−2)-th round of consensus (where N is greater than 2). It is assumed that the blockchain nodes A, B, and C all crash in the process of writing the transaction of the N-th round of consensus into a block, and as a result, no block in which the transaction of the N-th round of consensus is written is generated in the respective sub-blockchains. In this case, the blockchain nodes A, B, and C separately retrieve consensus execution logs from existing blocks in the respective sub-blockchains, to simulate the N-th round of consensus, thereby re-determining the transaction of the N-th round of consensus which is lost due to the crash. Then, the blockchain nodes A, B, and C each perform a block write operation for the re-determined transaction of the N-th round of consensus, to generate a new block in the local sub-blockchain. The blockchain node does not need to execute the transaction of the N-th round of consensus again after simulating the N-th round of consensus.

The following illustrates a procedure of processing transactions of a plurality of consensus rounds by using the method according to the embodiments of this specification. The procedure mainly includes the following steps.

After execution of transactions of an N-th round of consensus in a blockchain is completed, blockchain nodes in the blockchain perform block write operations for a first transaction set on which the N-th round of consensus is reached; at the same time, a consensus master node among the blockchain nodes initiates a proposal for an (N+1)-th round of consensus, and the blockchain nodes execute the (N+1)-th round of consensus.

After completing the (N+1)-th round of consensus, the blockchain nodes execute a second transaction set on which the (N+1)-th round of consensus is reached.

After completing the block write operation for the first transaction set and the execution of the second transaction set, the blockchain nodes write the second transaction set into blocks; at the same time, a consensus master node among the blockchain nodes initiates a proposal for an (N+2)-th round of consensus, and the blockchain nodes execute the (N+2)-th round of consensus.

Other rounds are performed in a similar manner based on the foregoing principle, and are not illustrated in detail herein.

Figure 4:
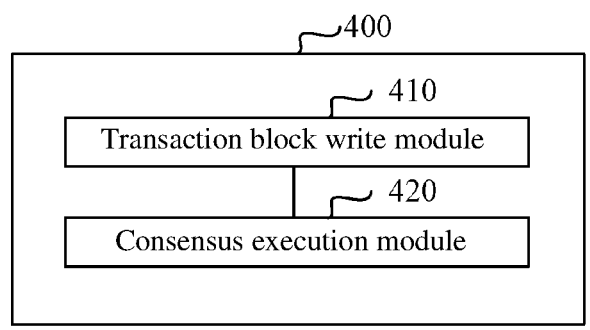
FIG. 4 is a schematic structural diagram of a transaction processing apparatus for a blockchain according to an embodiment of this specification.

Corresponding to the foregoing method, as shown in FIG. 4, the embodiments of this specification further provide a transaction processing apparatus 400, including a transaction block write module 410, configured to perform, after execution of a transaction of an N-th round of consensus of a blockchain is completed, a block write operation for the transaction of the N-th round of consensus, where N is a positive integer; and a consensus execution module 420, configured to execute an (N+1)-th round of consensus execution operation of the blockchain, where the consensus execution operation includes an (N+1)-th round of consensus of the blockchain and transaction execution after the (N+1)-th round of consensus is reached, and the (N+1)-th round of consensus execution operation is executed concurrently with the block write operation in the N-th round.

Based on the transaction processing apparatus for a blockchain shown in FIG. 4 that, according to the solution in this embodiment of this specification, the block write operation for the transaction of the N-th round of consensus is executed concurrently with the (N+1)-th round of consensus execution operation. That is, while writing a transaction of a current round into a block, the blockchain node also executes a next round of consensus and a transaction on which the next round of consensus is reached, thereby improving the transaction processing efficiency, so that the blockchain is applicable to application scenarios with high service concurrency.

In some embodiments, during execution, the transaction block write module 410 is configured to perform, after the execution of the transaction of the N-th round of consensus of the blockchain is completed, the block write operation for the transaction of the N-th round of consensus by using a first thread. During execution, the consensus execution module 420 is configured to execute the (N+1)-th round of consensus execution operation of the blockchain by using a second thread, where the second thread is different from the first thread.

In some embodiments, the transaction processing apparatus configures, for the first thread and the second thread, a thread lock for accessing blockchain resources such as shared state variables, to ensure the thread safety of the first thread and the second thread. In the first thread and the second thread, a thread corresponding to a preceding consensus round requests a usage right of the thread lock before a thread corresponding to a post consensus round.

In some embodiments, based on the above, the transaction block write module 410 may monitor, by using a third thread (where the third thread may be the first thread, or may be a new thread other than the first thread and the second thread), whether a block write operation task exists in the second thread. After the (N+1)-th round of consensus execution operation is completed, if it is monitored, based on the third thread, that no block write operation task exists in the second thread, the transaction block write module 410 adds a block write operation task for the transaction of the N-th round of consensus to the second thread.

Further, in addition to the concurrent execution, ensuring smoothness of the block write is also an important means for improving the transaction processing efficiency of the blockchain.

Therefore, in the embodiments of this specification, if the transaction block write module 410 crashes when performing the block write operation for the transaction of the N-th round of consensus, after being restarted and recovered, the transaction block write module 410 may obtain, from another blockchain node, information of a block in which the transaction of the N-th round of consensus is written, to perform the block write operation again for the transaction of the N-th round of consensus based on the information of the block, where the block is generated by the another blockchain node by completing a block write operation for the transaction of the N-th round of consensus.

In addition, if the transaction block write module 410 fails to obtain, from the another blockchain node after being restarted and recovered, the information of the block in which the transaction of the N-th round of consensus is written, the transaction block write module 410 simulates the N-th round of consensus based on a consensus execution log, to re-determine the transaction of the N-th round of consensus. Then, the block write operation is performed for the re-determined transaction of the N-th round of consensus again. It should be noted herein that, the blockchain node does not need to execute the simulated transaction of the N-th round of consensus again.

In some embodiments, the (N+1)-th round of consensus is initiated by a target blockchain node in the blockchain when the block write operation is performed for the transaction of the N-th round of consensus, and the target blockchain node serves as a consensus master node of the blockchain.

In addition, the blockchain node may generate a service logic error when performing block write operations for transactions of different consensus rounds simultaneously, which results in a system crash. To avoid this problem, in a preferred solution, the transaction block write module 410 in this embodiment of this specification performs the block write operation for the transaction of the (N+1)-th round of consensus after completing the block write operation for the transaction of the N-th round of consensus and the (N+1)-th round of consensus execution operation.

The consensus execution operation includes a submission commit operation after the transaction is executed, and the commit operation in the (N+1)-th round of consensus execution operation is executed after the block write operation for the transaction of the N-th round of consensus is completed.

Obviously, the transaction processing apparatus in this embodiment of this specification may be used as an entity for executing the transaction processing method shown in FIG. 1, and therefore can implement the functions implemented by the transaction processing method in FIG. 1 to FIG. 3. Since the principles are the same, details are not described herein again.

Figure 5:
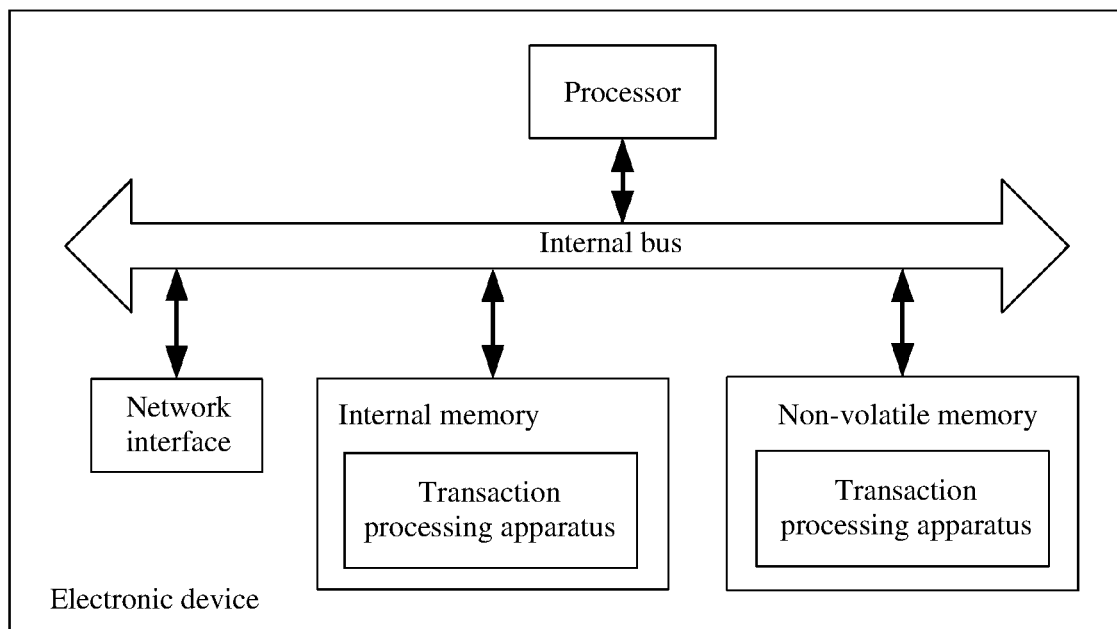
FIG. 5 is a schematic structural diagram of an electronic device according to an embodiment of this specification.

FIG. 5 is a schematic structural diagram of an electronic device according to an embodiment of this specification. Referring to FIG. 5, at a hardware level, the electronic device includes a processor, and optionally further includes an internal bus, a network interface, and a memory. The memory may include an internal memory, for example, a high-speed random access memory (RAM), or may further include a non-volatile memory, for example, at least one magnetic disk memory. Definitely, the electronic device may further include hardware required for other services.

The processor, the network interface, and the memory may be connected to each other through the internal bus. The internal bus may be an industry standard architecture (ISA) bus, a peripheral component interconnect (PCI) bus, an extended industry standard architecture (EISA) bus, or the like. The bus may be classified as an address bus, a data bus, a control bus, or the like. For ease of indication, the bus in FIG. 5 is represented by using only one bidirectional arrow, but it does not indicate that there is only one bus or one type of bus.

The memory is configured to store a program. Specifically, the program may include program code, and the program code includes a computer operation instruction. The memory may include an internal memory and a non-volatile memory, and provides an instruction and data to the processor.

The processor reads a corresponding computer program from the non-volatile memory to the internal memory and then runs the computer program to form a transaction processing apparatus at a logical level. The processor is configured to execute the program stored in the memory, and is specifically configured to execute the following operations:

performing, after execution of a transaction of an N-th round of consensus of a blockchain is completed, a block write operation for the transaction of the N-th round of consensus, where N is a positive integer; and executing an (N+1)-th round of consensus execution operation of the blockchain, where the consensus execution operation includes an (N+1)-th round of consensus of the blockchain and transaction execution after the (N+1)-th round of consensus is reached, and the (N+1)-th round of consensus execution operation is executed concurrently with the block write operation in the N-th round.

It can be learned based on the electronic device shown in FIG. 5 that, according to the solution in this embodiment of this specification, the block write operation for the transaction of the N-th round of consensus is executed concurrently with the (N+1)-th round of consensus execution operation. That is, while writing a transaction of a current round into a block, the blockchain node also executes a next round of consensus and a transaction on which the next round of consensus is reached, thereby improving the transaction processing efficiency, so that the blockchain is applicable to application scenarios with high service concurrency.

The foregoing transaction processing method disclosed in the embodiment shown in FIG. 1 of this specification may be applied to a processor, or may be implemented by a processor. The processor may be an integrated circuit chip, and has a signal processing capability. In an implementation process, steps of the foregoing method may be implemented by using a hardware integrated logic circuit in the processor or instructions in a form of software. The processor may be a general processor, including a central processing unit (CPU), a network processor (NP), and the like; or may further be a digital signal processor (DSP), an application-specific integrated circuit (ASIC), a field-programmable gate array (FPGA), or another programmable logical device, discrete gate or transistor logical device, or discrete hardware component. The processor can implement or execute each method, step, and logic block diagram disclosed in the embodiments of this specification. The general-purpose processor may be a microprocessor, or the processor may be any conventional processor or the like. Steps of the method disclosed with reference to the embodiments of this specification may be directly implemented by a hardware decoding processor, or implemented by a combination of hardware in the decoding processor and a software module. The software module may be stored in a storage medium that is mature in the art, such as a RAM, a flash memory, a read-only memory (ROM), a programmable ROM, an electrically erasable programmable memory, or a register. The storage medium is located in the memory. The processor reads information in the memory and completes the steps of the methods in combination with hardware thereof.

In some embodiments, the electronic device according to this embodiment of this specification can implement the functions of the foregoing apparatus in the embodiments shown in FIG. 1 to FIG. 3, and details are not described herein again.

Certainly, in addition to a software implementation, the electronic device in this specification does not exclude other implementations, such as a logic device, or a combination of software and hardware. In other words, the execution body of the following processing flow is not limited to each logic unit, or may be hardware or the logic device.

In addition, an embodiment of this specification further provides a computer readable storage medium. The computer readable storage medium stores one or more programs. The one or more programs include instructions, and when being executed by a portable electronic device including a plurality of application programs, the instructions cause the portable electronic device to perform the method according to the embodiment shown in FIG. 1, and are specifically configured to perform the following method: performing, after execution of a transaction of an N-th round of consensus of a blockchain is completed, a block write operation for the transaction of the N-th round of consensus, where N is a positive integer; and executing an (N+1)-th round of consensus execution operation of the blockchain, where the consensus execution operation includes an (N+1)-th round of consensus of the blockchain and transaction execution after the (N+1)-th round of consensus is reached, and the (N+1)-th round of consensus execution operation is executed concurrently with the block write operation in the N-th round.

In some embodiments, the foregoing instructions, when executed by a portable electronic device including a plurality of applications, can cause the foregoing transaction processing apparatus to implement the functions in the embodiments shown in FIG. 1 to FIG. 3, and details are not described herein again.

A person skilled in the art should understand that the embodiments of this specification may be provided as a method, a system, or a computer program product. Therefore, this specification may use a form of hardware only embodiments, software only embodiments, or embodiments with a combination of software and hardware. Moreover, this specification may use a form of a computer program product that is implemented on one or more computer-usable storage media (including but not limited to a disk memory, a CD-ROM, an optical memory, and the like) that include computer-usable program code.

Embodiments of this specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

The foregoing descriptions are merely embodiments of this specification, and are not intended to limit this specification. For a person skilled in the art, various modifications and changes may be made to this specification. Any modifications, equivalent replacements, and improvements made within the spirit and principle of this specification shall fall within the scope of the claims of this specification. In addition, all other embodiments obtained by a person of ordinary skill in the art without creative efforts shall fall within the protection scope of this specification.

What is claimed is:

1. A transaction processing method for a blockchain, comprising:
   creating, by a blockchain node in the blockchain, a first thread, a second thread, and a third thread;
   executing, by the blockchain node in the blockchain using the first thread, a consensus protocol for an N-th round of consensus, wherein N is a positive integer, and the consensus protocol comprises reaching a consensus on a blockchain transaction of the N-th round of consensus and upon the N-th round of consensus being reached, executing the blockchain transaction of the N-th round of consensus;

writing, by the blockchain node after the execution of the blockchain transaction using the second thread, a block comprising the blockchain transaction of the N-th round of consensus into the blockchain;

monitoring, by the blockchain node using the third thread, the second thread for detecting a completion of the writing of the block comprising the blockchain transaction of the N-th round of consensus in the second thread;

concurrently with the writing of the block comprising the blockchain transaction of the N-th round of consensus into the blockchain in the second thread, executing, by the blockchain node using the first thread, the consensus protocol for an (N+1)-th round of consensus in the blockchain and upon the (N+1)-th round of consensus being reached, executing, by the blockchain node using the first thread, a blockchain transaction of the (N+1)-th round of consensus in the blockchain;

in response to the third thread detecting the completion of the writing of the block comprising the blockchain transaction of the N-th round of consensus, adding a task of writing a block comprising the blockchain transaction of the (N+1)-th round of consensus into the second thread; and after both (1) the adding of the task of writing of the block comprising the blockchain transaction of the (N+1)-th round of consensus into the blockchain into the second thread and (2) the executing of the blockchain transaction of the (N+1)-th round of consensus in the blockchain in the first thread, concurrently executing, in the second thread, the task of writing the block comprising the blockchain transaction of the (N+1)-th round of consensus into the blockchain and executing, in the first thread, the consensus protocol for an (N+2)-th round of consensus in the blockchain.

2. The transaction processing method according to claim 1, further comprising:
creating, by the blockchain node for the first thread and the second thread, a thread lock for accessing blockchain variables shared by different blockchain transactions, and in the first thread and the second thread, a thread corresponding to a preceding consensus round requests a usage right of the thread lock before a thread corresponding to a post consensus round.

3. The transaction processing method according to claim 1, further comprising:
if the blockchain node crashes when performing the writing of the block comprising the transaction of the N-th round of consensus, obtaining, by the blockchain node from another blockchain node after being restarted and recovered, information of a block in which the transaction of the N-th round of consensus is written; and performing the writing of the block again for the transaction of the N-th round of consensus based on the information of the block, wherein the block is generated by the another blockchain node by completing a block write operation for the transaction of the N-th round of consensus.

4. The transaction processing method according to claim 3, further comprising:

if the blockchain node fails to obtain, from the another blockchain node after being restarted and recovered, the information of the block in which the transaction of the N-th round of consensus is written, simulating, by the blockchain node, the N-th round of consensus based on a consensus execution log, to re-determine the transaction of the N-th round of consensus; and performing the writing of the block again for the re-determined transaction of the N-th round of consensus.

5. The transaction processing method according to claim 1, wherein
the (N+1)-th round of consensus is initiated by a target blockchain node in the blockchain when the writing of the block comprising the transaction of the N-th round of consensus is performed, and the target blockchain node serves as a consensus master node of the blockchain.

6. The transaction processing method according to claim 1, wherein the executing the consensus protocol for the (N+1)-th round of consensus in the blockchain comprises:
reaching a consensus on a blockchain transaction of the (N+1)-th round of consensus;
upon the consensus being reached, executing the blockchain transaction of the (N+1)-th round of consensus; and
adjusting a tree structure of the blockchain by submitting a commit operation before writing a block comprising the blockchain transaction of the (N+1)-th round of consensus into the blockchain;
wherein the commit operation is submitted after the writing of the block comprising the blockchain transaction of the N-th round of consensus into the blockchain.

7. A system of a blockchain node in a blockchain, comprising one or more processors and one or more non-transitory computer-readable memories storing instructions that, when executed by the one or more processors, cause the system to perform operations comprising:
creating, by the blockchain node in the blockchain, a first thread, a second thread, and a third thread;
executing, by the blockchain node in the blockchain using the first thread, a consensus protocol for an N-th round of consensus, wherein N is a positive integer, and the consensus protocol comprises reaching a consensus on a blockchain transaction of the N-th round of consensus and upon the N-th round of consensus being reached, executing the blockchain transaction of the N-th round of consensus;
writing, by the blockchain node after the execution of the blockchain transaction using the second thread, a block comprising the blockchain transaction of the N-th round of consensus into the blockchain;
monitoring, by the blockchain node using the third thread, the second thread for detecting a completion of the writing of the block comprising the blockchain transaction of the N-th round of consensus in the second thread;
concurrently with the writing of the block comprising the blockchain transaction of the N-th round of consensus into the blockchain in the second thread, executing, by the blockchain node using the first thread, the consensus protocol for an (N+1)-th round of consensus in the blockchain and upon the (N+1)-th round of consensus being reached, executing, by the blockchain node using the first thread, a blockchain transaction of the (N+1)-th round of consensus in the blockchain;

in response to the third thread detecting the completion of the writing of the block comprising the blockchain transaction of the N-th round of consensus, adding a task of writing a block comprising the blockchain transaction of the (N+1)-th round of consensus into the second thread; and after both (1) the adding of the task of writing of the block comprising the blockchain transaction of the (N+1)-th round of consensus into the blockchain into the second thread and (2) the executing of the blockchain transaction of the (N+1)-th round of consensus in the blockchain in the first thread, concurrently executing, in the second thread, the task of writing the block comprising the blockchain transaction of the (N+1)-th round of consensus into the blockchain and executing, in the first thread, the consensus protocol for an (N+2)-th round of consensus in the blockchain.

8. The system of claim 7, wherein the operations further comprise:
creating, by the blockchain node for the first thread and the second thread, a thread lock for accessing blockchain variables shared by different blockchain transactions, and in the first thread and the second thread, a thread corresponding to a preceding consensus round requests a usage right of the thread lock before a thread corresponding to a post consensus round.

9. The system of claim 7, wherein the operations further comprise:
if the blockchain node crashes when performing the writing of the block comprising the transaction of the N-th round of consensus, obtaining, by the blockchain node from another blockchain node after being restarted and recovered, information of a block in which the transaction of the N-th round of consensus is written; and
performing the writing of the block again for the transaction of the N-th round of consensus based on the information of the block, wherein the block is generated by the another blockchain node by completing a block write operation for the transaction of the N-th round of consensus.

10. The system of claim 9, wherein the operations further comprise:
if the blockchain node fails to obtain, from the another blockchain node after being restarted and recovered, the information of the block in which the transaction of the N-th round of consensus is written, simulating, by the blockchain node, the N-th round of consensus based on a consensus execution log, to re-determine the transaction of the N-th round of consensus; and
performing the writing of the block again for the re-determined transaction of the N-th round of consensus.

11. A non-transitory computer-readable storage medium of a blockchain node in a blockchain, storing instructions that, when executed by one or more processors, cause the one or more processors to perform operations comprising:
creating, by the blockchain node in the blockchain, a first thread, a second thread, and a third thread;
executing, by the blockchain node in the blockchain using the first thread, a consensus protocol for an N-th round of consensus, wherein N is a positive integer, and the consensus protocol comprises reaching a consensus on a blockchain transaction of the N-th round of consensus and upon the N-th round of consensus being reached, executing the blockchain transaction of the N-th round of consensus;

writing, by the blockchain node after the execution of the blockchain transaction using the second thread, a block comprising the blockchain transaction of the N-th round of consensus into the blockchain;
monitoring, by the blockchain node using the third thread, the second thread for detecting a completion of the writing of the block comprising the blockchain transaction of the N-th round of consensus in the second thread;
concurrently with the writing of the block comprising the blockchain transaction of the N-th round of consensus into the blockchain in the second thread, executing, by the blockchain node using the first thread, the consensus protocol for an (N+1)-th round of consensus in the blockchain and upon the (N+1)-th round of consensus being reached, executing, by the blockchain node using the first thread, a blockchain transaction of the (N+1)-th round of consensus in the blockchain;
in response to the third thread detecting the completion of the writing of the block comprising the blockchain transaction of the N-th round of consensus, adding a task of writing a block comprising the blockchain transaction of the (N+1)-th round of consensus into the second thread; and
after both (1) the adding of the task of writing of the block comprising the blockchain transaction of the (N+1)-th round of consensus into the blockchain into the second thread and (2) the executing of the blockchain transaction of the (N+1)-th round of consensus in the blockchain in the first thread, concurrently executing, in the second thread, the task of writing the block comprising the blockchain transaction of the (N+1)-th round of consensus into the blockchain and executing, in the first thread, the consensus protocol for an (N+2)-th round of consensus in the blockchain.

12. The non-transitory computer-readable storage medium of claim 11, wherein the (N+1)-th round of consensus is initiated by a target blockchain node in the blockchain when the block write operation is performed for the transaction of the N-th round of consensus, and the target blockchain node serves as a consensus master node of the blockchain.

13. The non-transitory computer-readable storage medium of claim 11, wherein the executing the consensus protocol for the (N+1)-th round of consensus in the blockchain comprises:
reaching a consensus on a blockchain transaction of the (N+1)-th round of consensus;
upon the consensus being reached, executing the blockchain transaction of the (N+1)-th round of consensus; and
adjusting a tree structure of the blockchain by submitting a commit operation before writing a block comprising the blockchain transaction of the (N+1)-th round of consensus into the blockchain;
wherein the commit operation is submitted after the writing of the block comprising the blockchain transaction of the N-th round of consensus into the blockchain.

14. The non-transitory computer-readable storage medium of claim 11, wherein the operations further comprise:
creating, by the blockchain node for the first thread and the second thread, a thread lock for accessing blockchain variables shared by different blockchain transactions, and in the first thread and the second thread, a thread corresponding to a preceding consensus round requests a usage right of the thread lock before a thread corresponding to a post consensus round.

* * * * *